Patented Sept. 14, 1937

2,093,069

UNITED STATES PATENT OFFICE 2,093,069

ICE GLAZING OF FROZEN FISH AND OTHER FROZEN FOODS

Robert Henry Bedford, Prince Rupert, British Columbia, Canada

No Drawing. Application December 11, 1935, Serial No. 53,905. In Canada September 30, 1935

10 Claims. (Cl. 99—195)

This invention relates to a process for making ice and for ice glazing frozen fish and other frozen foods or the containers in which they may be stored or transported.

For the purpose of explaining the process I have chosen to deal specifically with the ice glazing of frozen fish.

The purpose of freezing fish and storing or transporting them at low temperatures is to prevent or delay certain (1) physical and (2) chemical changes in their cells and also to (3) kill, retard or inhibit the growth of microörganisms, which are in or on the fish, conditions commonly spoken of as preservation, so as to maintain the product in a palatable and salable condition.

*Physical and chemical effects of storage below freezing point of fish*

One of the principal physical changes that storage at temperatures below the freezing point of the fish brings about is to reduce the rate of evaporation of water from the fish cells. But even at very low temperatures, say —20° C., the rate of evaporation is comparatively so great that fish become dry or dehydrated in a short time, which in turn causes undesirable changes in the chemical nature of the fish cells and their constituents, thus the time of storage is reduced if the fish are to be maintained in a palatable and salable condition.

*Existing method for protection of fish in cold storage*

In order to stop evaporation directly from frozen fish which are to be stored, it is customary to dip them for a few seconds in water at a temperature of about 3.5 to 2.5° C.—the water bath or glazing tank for dipping being in a room where the temperature is considerably below the freezing point of water—before placing the fish in storage. The water in contact with the surface of the fish freezes, forming a thin layer of ice, which is called the glaze. This process of dipping the same fish is repeated a number of times, so as to increase the thickness of the ice layer. When fish are dipped at such temperatures the glaze is thinner than if the temperature of the water were nearer its freezing point.

When glazed fish are stored at temperatures below the freezing point of water, evaporation of water takes place from the ice glaze instead of from the fish, and thus the glaze maintains intact the water in the fish cells.

*Limitations and defects of the ordinary water glaze*

The glaze so formed is not stable, and either (1) it cracks immediately in many places or (2) it cracks in many places shortly after storage. This cracked condition is due to the difference in the rates of contraction and expansion of the fish and the ice glaze, the former warming up by extracting the heat from the water with simultaneous expansion, while at the same time the latter is being cooled by the fish with simultaneous contraction as the temperature of the ice is cooled below its freezing point.

The cracking becomes greater as the difference in temperatures between the freezing point of the glazing water and the frozen fish being glazed becomes greater.

Where a crack in the glaze appears there is evaporation of water directly from the cells of that part of the fish and later from the adjacent cells, and when fish so glazed are being moved from one position to another in cold storage, or when they are being transported, the cracking may be increased or the ice chipped off because of its brittleness.

The cracking of the glaze is so great with fish taken directly from the freezer, because of the wide range of temperature between the fish and the glazing water, that the custom in general is to permit the outer parts of the fish to become warmer by leaving them in the glazing room (which is at a higher temperature than the freezer room) for some time before applying the glaze.

*Advantages of a non-cracking glaze*

If this cracking condition can be overcome, the following benefits will accrue:—

I. Evaporation of water from the fish will be reduced,

II. The cell constituents will remain longer in their natural condition,

III. The texture, palatability and natural appearance of the fish will be maintained longer, IV. The fish will be better protected as the glaze will not chip off under shock, and therefore may be more safely handled in cold storage or transport to market, If the temperature of the glazing water can be reduced nearer to its freezing point without causing cracking the following additional benefits will accrue:—

V. The glaze will be thicker,

VI. A thicker glaze will enable the fish to remain in cold storage for a longer period, or to be transported a longer distance without dehydration.

*An essential physical property of a non-cracking glaze*

An essential physical property of solutions suitable for producing a non-cracking ice is that their coefficient of linear expansion at temperatures below their freezing point must be close to the coefficient of linear expansion of the fish being glazed at similar temperatures.

With these premises in mind I have discovered that aqueous solutions of certain chemical substances of eutectic concentration when used for the purpose of ice glazing fish meet the conditions necessary to bring about the changes enumerated above.

*I.—Advantages of an eutectic concentration solution for making into ice*

An eutectic concentration of any solution for making into ice is:

I. The only kind of solution that will not vary at or below its freezing point.

II. The only kind of solution that will give a homogeneous distribution throughout the ice of the substance in solution.

III. The only kind of solution that when made into ice will confer upon it stable physical properties throughout its entire volume, e. g. uniform coefficient of linear expansion exemplified practically in a stable non-cracking and shock-resistant glaze over the whole fish.

*II.—Disadvantages of a non-eutectic concentration solution for making into ice*

I. A non-eutectic concentration of any solution will vary with the temperature. When the concentration is less than the eutectic and solution at the depressed freezing point of the solvent, water freezes out leaving a more concentrated solution. This phenomenon continues until the eutectic concentration and temperature are reached, when the solution uniformly becomes solid. And conversely, when the concentration is greater than the eutectic, and the solution at the freezing point the substance in solution freezes out first and this continues until the eutectic is reached. Therefore under these conditions:

II. The chemical substance of the solution will not be uniformly distributed throughout the ice, and III. This uneven distribution of the chemical substance in the ice will confer upon it unstable physical properties and cracking will occur in different places.

*Some illustrative eutectic solutions for the process*

Several illustrative substances which I have found to have the properties mentioned above are as follows:

| Chemical | Eutectic concentration | Eutectic temp. ° C. |
| --- | --- | --- |
| | Wt. (approx.) | (Approx.) |
| Di-sodium acid phosphate ($Na_2HPO_4.12H_2O$). | 3.0% | −0.5 |
| Sodium carbonate ($Na_2CO_3$). | | −2.1 |
| Sodium sulphate ($Na_2SO_4$). | 3.8 | −1.2 |
| Sodium sulphate ($Na_2SO_4.10H_2O$). | 8.7 | −1.2 |
| Calcium lactate ($Ca(C_3H_5O_3)_2.5H_2O$). | 3.0 | −0.8 |
| Boric acid ($H_3BO_3$). | 2.5 | −0.8 |

The eutectic concentrations of (1) disodium acid phosphate, (2) sodium carbonate, (3) sodium sulphate, (4) calcium lactate, form a whitish, homogeneous ice, covering the whole fish, which does not crack and will only chip under the force of a heavy blow.

In regard to the use of disodium acid phosphate, it has been established scientifically that it is a natural constituent of the muscle cells of fish, as well as of the blood and body cells of man, where it functions, inter alia, as an effective buffer in maintaining the chemical equilibrium so necessary for normal physiological processes.

*The use of boric acid*

The eutectic concentration of an aqueous solution of boric acid forms a whitish, homogeneous ice glaze over the whole frozen fish, which does not crack and will only chip off under the force of a heavy blow.

In some countries the use of a preservative such as boric acid is not permitted to be mixed with foods. But it is desired to point out that the boric acid is not mixed with the fresh fish but added in the form of an ice after they have been frozen. The fish are then stored at temperatures far below their freezing point and the eutectic temperature of the boric acid solution, so that solution and penetration of the chemical in the juices of fish cells cannot take place. Upon thawing and washing the fish for 5 minutes in running water I have found in the muscle the negligible quantity of 1 part of boric acid to 20,000 parts of the fish.

I have also found that when an ice glaze of boric acid is used on frozen fish it is able to stop certain discolorations which appear on the fish in cold storage. These discolorations arise from two causes (1) chemical, (2) microbiological, which are discussed below under these headings. For these reasons, therefore boric acid may be substituted to advantage for di-sodium acid phosphate or for any other chemical substance, which confers non-cracking properties on ice, in the processing of fish prepared for sale in any country in which the use of boric acid, as a preservative, is permitted.

1.—CHEMICAL

*The production of colours on fish*

All fish have oils in certain of their muscle cells, the quantity generally varying with the different species. These oils do not generally consist of single chemical compounds but rather of a number of very complex substances which, when extracted under appropriate conditions from healthy fish immediately they have been killed, have a clear, colourless or light straw-coloured appearance, and the fish consequently do not show on their surfaces any abnormal discoloration.

It has been observed however, that in such frozen fish as herring, menhaden, pilchard, different species of salmon and cod, and halibut, a yellow, orange or red, or one having various tones of yellow and red discoloration, frequently appears on different parts of the body after varying periods of cold storage. On the halibut it shows particularly on the white underside of the body.

This yellow, orange or red discoloration not only detracts from the general appearance but often means discarding the product. The economic loss to the industry is a severe one.

The ordinary water glaze does not stop this discoloration.

Upon investigating this matter I have determined that these discolorations may be brought about by the following conditions:

When certain constituents of the fish oils have become changed to other substances they become colored when (a) Ammonia comes in contact with the changed oils, (b) The pH of the environment (the fish cells) of the oils is approx. pH 6.6 or more.

As is well known, certain cold storages utilize the direct expansion of liquid ammonia for cooling the rooms. Quite often ammonia gas leaks into the rooms, comes in contact with the moisture of the atmosphere and forms ammonium hydroxide, which is alkaline, or if the ice is cracked the ammonia may come in direct contact with the fish, in both cases causing the red, orange, or yellow discoloration, depending upon the amount of the reacting chemical substances and the time the fish have been exposed to the ammoniacal substances.

When a fish is glazed with an eutectic mixture of boric acid according to this process it is homogeneously covered and the glaze is comparatively thick and hence the ammonia gas or ammonium hydroxide cannot reach the fish directly. Neither can it cause an alkaline reaction in the glaze because of the acidity of the boric acid in it. Therefore, when a fish is glazed with an eutectic mixture of boric acid it does not become discoloured red, orange, or yellow by reason of the presence of ammonia.

If through chemical reactions taking place in the cells of the fish (changes are known to take place at as low temperatures as −10° to −20° C. and there are solutions of salts in the fish cells unfrozen at these temperatures) the environment of the oil could become alkaline, then the alkaline reaction of those cells in contact with the acid would be neutralized and made slightly acid.

2.—MICROBIOLOGICAL

*The production of colours on fish by chromogenic micro-organisms*

The colours of red, orange, yellow and green or bluish yellow, and tones of all of these, are often present on fresh and frozen fish, and are not caused by the discoloration of the oil.

I have investigated these conditions and have found that the cause of the discolorations is the result of the growth on fish of certain chromogenic bacteria.

When the fish are frozen and cold stored, many of these bacteria survive, and if the temperature of storage is not kept very low, at least −10° C., they will continue to grow and thus discolour the fish.

If they are able to grow the ordinary water glaze does not affect them.

When, however, the glaze contains boric acid most of them are killed and when any survive their rate of growth is negligible. For example, a population of chromogenic and other bacteria growing in halibut muscle suspension and an eutectic concentration of boric acid at −10° C. was reduced from 280,000 to 80 organisms per cubic centimetre at the end of four months—the first period of sampling. Therefore a glaze consisting of an eutectic mixture of boric acid stops the formation of this type of discoloration by reason of its antiseptic properties.

*Production of colour on fish by non-chromogenic micro-organisms*

There are other bacteria living on fresh and frozen fish, not themselves chromogens, which I have discovered are able to produce a yellow, orange, or red discoloration of the oils of fish, the colours and the fundamental basis for their production being the same as those caused by chemical means alone.

These bacteria have the property of being able to produce ammonia and substituted ammonia compounds, or causing the formation of them as a result of their metabolism and their environment.

These non-chromogenic bacteria survive freezing and cold storage to which the fish are subjected. If the temperature of storage is not kept very low, at least −10° C., they will continue to grow and produce ammonia or related compounds from the fish muscle, skin, or slime which in turn causes a change in the hydrogen ion concentration in the fish cells. When this change reaches pH 6.6 or becomes more alkaline, the colour of the oil in the cells changes to either yellow, orange, or red, or some tone of these, depending upon the hydrogen ion concentrations and the reacting constituents of the oil respectively.

The ordinary water glaze on fish has no effect in controlling this condition.

The eutectic boric acid glaze controls this condition either by killing the bacteria or by greatly reducing the metabolic rate of those surviving.

*Preservative effect while being thawed*

The microbial population ordinarily on the surfaces of frozen fish is comparatively large even after long periods of storage. The ordinary water glaze has no effect in reducing this population.

When the fish are thawed this population becomes very active and decomposition sets in. The length of time during which fish can be kept after they are thawed depends to some extent upon the the size of the microbial population.

When fish are glazed with an eutectic solution of boric acid, the microbial population is reduced to a negligible number as before mentioned. Upon the fish being thawed a much longer time will elapse, other conditions of the environment being equal, before the population assumes a magnitude similar to that where ordinary water had been used to glaze fish. Thus the period for which fish so treated can be kept—their quality maintained—will be lengthened.

Boric acid then serves the triple purpose in this process of:

(1) Conferring on the ice non-cracking properties, (2) Preventing discoloration in cold storage caused by chemical and biological agencies.

(3) Acting as a preservative.

The use of di-sodium acid phosphate will not prevent discoloration if the oil of the substance being treated is rancid and neither will it act as a preservative, but it does confer no cracking properties on the ice equal to those of boric acid. Therefore, boric acid may be substituted to advantage for disodium acid phosphate or for any other chemical substance which confers non-cracking properties on ice in the processing of fish prepared for sale in any country in which the use of boric acid as a preservative is permitted.

*Loss of glaze in cold storage by evaporation*

When fish, glazed either with ordinary water or with an eutectic solution, are placed in an ordinary commercial cold storage room there is loss of the glaze by evaporation. The water of the glaze is transferred to the cooling coils of the cold storage room, and the longer the fish are in storage the greater is the quantity transferred. The reason for this condition is the variation in the relative humidity of the stratified atmosphere of the room, which in turn is dependent upon the temperature variations of the room.

Temperature variations are caused by the necessary difference in the temperatures between the cooling coils in the room and the fish. This difference in temperature is generally about 7° C. (the cooling coils being colder than the product stored) and is necessary because heat transferred to the room from external sources tends to raise the temperature of the empty room itself. These external sources may be summarized as follows: (1) From the product itself going into the storage room at a higher temperature than the room, (2) From intermittent sources of heat entering the room other than from the stored product, e. g., from the body of workmen, (3) From outside sources of heat transferred to the room via the insulated walls, floors, and ceilings. The result of these variations in temperature is to cause a streaming effect of the air of the room from the warm parts to the less warm parts. As the warm air rises and comes in contact with the cold cooling coils situated on the ceiling of the room its temperature is lowered, its water vapor holding capacity is reduced, and part of the water vapor it contained at the higher temperature is condensed and then frozen on the cold coils, forming around them a covering of ice particles. The now colder and heavier air circulates downwards, becomes warmed by reason of the sources of heat mentioned above, thereby increasing its water vapor holding capacity, comes in contact with the glaze of the fish or the fish itself, picks up moisture, rises and ultimately strikes the colder pipes, and the cycle of events is regenerated. The transfer of water from the glazed fish to the cooling coils may take a long time or a short time, depending upon the conditions outlined above, but in any case the fish can remain in cold storage for a limited time only, after which it is necessary that they be reglazed. Much damage to the product is often done before this reglazing can be attended to, and much labour is also necessary to accomplish this additional work.

Therefore, if a substance, or substances, harmless to the fish and the consumer, could be added to the glazing water which would reduce the vapor pressure of the ice glaze so that it is nearer to the vapor pressure of the ice on the cooling coils of the room, then:

(1) The glaze would remain on the fish for a much longer period.

(2) The fish could remain in cold storage for a much longer period without being reglazed.

(3) The fish would be protected from dehydration, and their original palatability and marketability more nearly maintained.

*Reducing the loss of glaze on fish in cold storage*

With these premises in mind I have discovered that when 2.9% by weight of glycerol ($C_3H_8O_3$), sp. g. 1.26, is added to the water to be used for the purpose of glazing frozen fish either with the ordinary water glaze or one containing an eutectic concentration of a chemical substance, that the vapor pressure of the glaze is reduced to a negligible amount compared with the vapor pressure corresponding to ice or supercooled water at such low temperatures as is used in the storage of frozen fish, and the three (3) aims above-mentioned are attained.

This result is dependent upon and explained in accordance with the theory of the physical states of aqueous solutions of certain types of inorganic and organic substances (of which glycerol is one) at different temperatures. For example, it has been shown scientifically that when a dissolved substance is non-volatile and not dissociated into its constituent ions the vapor pressure of a dilute solution is lower than that of the pure solvent at the same temperature by an amount which is proportional to the concentration of the dissolved substance. And also the depression of the freezing point for a dilute solution is proportional to the concentration of the dissolved substance. There is then a relationship between the vapor pressure lowering and the freezing point depression of a glycerol solution. The part played by these two (2) aspects of the physical state of aqueous solutions of glycerol at low temperatures is discussed below:

In applying temperatures below the freezing point of water to a 2.9% by weight aqueous solution of glycerol the solvent gradually freezes as the temperature is lowered below the depressed molecular freezing point, which is $-0.606°$ C., for that particular concentration of the pure substances, and consequently the solution becomes more concentrated. This phenomenon of freezing out of solvent and the consequent increasing concentration of solute continues until the temperature reaches $-47°$ C. and the solution contains about 70% by weight of glycerol, but when a greater percentage than this is present the temperature of the freezing point rises. This phenomenon, however, takes place only if the temperature is slowly lowered, but if the range of temperature between the depressed freezing point of the solution and the lower temperature of the environment is wide, then freezing takes place quickly and the glycerol is distributed throughout the sponge-like system of ice particles. In glazing frozen fish under commercial conditions the difference between the lower temperature of the frozen fish itself and the eutectic temperature of the eutectic solution plus 2.9% glycerol may be of the order of 30° C., so that when fish are glazed with a mixture of an eutectic solution of 2.9% glycerol the eutectic glaze is formed instantaneously, and the glycerol is dispersed throughout the glaze, and an extremely thin layer appears on the surface of the glaze.

The point I wish to emphasize here is that scattered throughout the ice glaze there are numerous minute pockets between the ice crystals which contain a concentrated glycerol solution, and also on the surface of the ice glaze there is a very thin layer of this solution which does not freeze at commercial storage temperatures, and hence this concentrated solution exerts a vapor pressure lowering corresponding to the concentration and the temperature at which the product is stored. What the concentrations of the glycerol solution may be at certain cold storage temperatures can be calculated from the formula $$g = \frac{M}{Kt}$$

where $g$=concentration of solute in 100 g. of solvent at $t°$ centigrade, $M$=molecular weight of glycerol and $k=18.6$ the freezing point constant for water. For example:

| Temperature | Concentration in 100 g. of water |
|---|---|
| −10° C. | 50.0 g. |
| −15° | 74.0 g. |
| −20° | 99.0 g. |
| −30° | 148.0 g. |

As an illustration of the vapor pressure lowering, take for example, the case of a 40% by weight aqueous solution of glycerol and compare it with pure water at 0° C. Let $$\frac{100\,(p_o-p)}{M\,p_o}=1.27$$

(International Critical Tables, volume 3, page 293), where $M$=the number of gram-formula weights of solute per 1000 g. $H_2O$, $p$=partial vapor pressure of the solvent from the solution, $p_o$=its vapor pressure in the pure state at the same temperature, then the vapor pressure is equivalent to 2.3 mm. Hg, a value which is comparable to the vapor pressure of ice at −9° C.—a difference of 9° due to the addition of the glycerol. This 9° interval in temperature and its corresponding vapor pressure lowering of the glycerol solution is a point that I wish in particular to emphasize, for it is very close to a 7° interval in temperature, which is often the temperature difference between the cooling coils and the product being stored under commercial conditions. The illustration chosen has been worked out for conditions at the relatively high temperature of 0° C., but the same ratio of values, at least, would hold good at the lower temperatures actually used in commercial practice.

I desire it to be understood that the addition of glycerol to the eutectic glaze is necessary only for reducing its vapor pressure and does not play any part in the specific properties already bespoken for an eutectic solution.

I have specifically cited frozen fish as an example for illustrating the application of this process of grazing, but I desire it to be understood that it applies also to the glazing of other frozen foods, or the containers in which they may be placed for storage or transport, and to the making of eutectic ice.

What I claim is:
1. Frozen flesh foods having a substantially non-cracking ice glaze formed of a frozen composition comprising water and a chemical compound in proportions forming an eutectic composition having an eutectic temperature of from approximately −0.5° C. to approximately −2.1° C.
2. Frozen flesh foods having a substantially non-cracking ice glaze formed of a frozen composition comprising water and a chemical compound in proportions forming an eutectic composition having an eutectic temperature of from approximately −0.5° C. to approximately −1.2° C.
3. Frozen flesh foods having a substantially non-cracking ice glaze formed of a frozen composition comprising water and disodium acid phosphate in proportions forming an eutectic composition.
4. Frozen flesh foods having a substantially non-cracking ice glaze formed of a frozen composition comprising water and sodium sulphate in proportions forming an eutectic composition.
5. Frozen flesh foods having a substantially non-cracking ice glaze formed of a frozen composition comprising water and boric acid in proportions forming an eutectic compound.
6. Frozen fish having a substantially non-cracking ice glaze formed of a frozen composition comprising water and a chemical compound in proportions forming an eutectic composition having an eutectic temperature of from approximately −0.5° C. to approximately −2.1° C.
7. Frozen fish having a substantially non-cracking ice glaze formed of a frozen composition comprising water and a chemical compound in proportions forming an eutectic composition having an eutectic temperature of from approximately −0.5° C. to approximately −1.2° C.
8. Frozen fish having a substantially non-cracking ice glaze formed of a frozen composition comprising water and disodium acid phosphate in proportions forming an eutectic composition.
9. Frozen fish having a substantially non-cracking ice glaze formed of a frozen composition comprising water and sodium sulphate in proportions forming an eutectic composition.
10. Frozen fish having a substantially non-cracking ice glaze formed of a frozen composition comprising water and boric acid in proportions forming an eutectic compound.

ROBERT HENRY BEDFORD.